United States Patent
Kanagawa et al.

(10) Patent No.: US 6,202,349 B1
(45) Date of Patent: Mar. 20, 2001

(54) WINDING DEVICE, AND A VESSEL INCORPORATING ADVANTAGES OF A FLOWER-ARRANGING VASE, A FLOWER-POT, AND AN ARTIFICIAL-FLOWER BASKET

(75) Inventors: Mikihiko Kanagawa, Kashihara; Sadao Kanagawa, 2-5-3 Hirai-Cho, Kusatsu-Shi, Shiga, Kusatsu, 525-0024, both of (JP)

(73) Assignee: Sadao Kanagawa, Shiga (JP)

( * ) Notice: Subject to any disclaimer, the term of this patent is extended or adjusted under 35 U.S.C. 154(b) by 0 days.

(21) Appl. No.: 09/247,238

(22) Filed: Feb. 10, 1999

(30) Foreign Application Priority Data

Feb. 12, 1998 (JP) .................................................. 10-071169

(51) Int. Cl.[7] .................................................. A01G 9/02
(52) U.S. Cl. .................................. 47/83; 47/66.6; 47/39
(58) Field of Search ................... 47/83, 39, 65.5, 47/66.1, 66.5, 66.6, 67; 206/423; 248/146; 428/23

(56) References Cited

U.S. PATENT DOCUMENTS

| | | | |
|---|---|---|---|
| D. 281,406 | * 11/1985 | Guenat | D11/143 X |
| D. 382,511 | * 8/1997 | Azarian | D11/143 |
| D. 400,822 | * 11/1998 | Therrien | D11/143 |
| 2,720,056 | * 10/1955 | Levy | 47/83 |
| 3,030,735 | * 4/1962 | Bokins | 47/39 |
| 3,108,401 | * 10/1963 | Richardson | 47/39 |
| 3,622,010 | * 11/1971 | Renelt . | |
| 3,944,186 | * 3/1976 | Einhorn et al. | 47/67 X |
| 4,006,559 | * 2/1977 | Carlyon, Jr. | 47/39 X |
| 4,159,094 | * 6/1979 | Stekoll et al. | 47/67 X |
| 4,187,996 | * 2/1980 | Ehrlich | 47/67 X |
| 4,250,666 | * 2/1981 | Rakestraw | 47/39 X |
| 4,614,056 | * 9/1986 | Farkas | 47/67 |
| 4,949,486 | * 8/1990 | Belokin et al. | 428/23 X |
| 5,052,148 | * 10/1991 | Sharon et al. | 47/67 |
| 5,065,971 | * 11/1991 | Gaube | 47/67 X |
| 5,118,059 | * 6/1992 | Mainer | 47/67 X |
| 5,309,671 | * 5/1994 | Byun | 47/83 |
| 5,438,797 | * 8/1995 | Lendel | 47/83 |
| 5,450,692 | * 9/1995 | Ruibal | 47/83 |
| 5,487,517 | * 1/1996 | Smith | 47/39 X |
| 5,570,785 | * 11/1996 | Honkawa | 47/66 X |
| 5,675,931 | * 10/1997 | Wasserman | 47/39 |
| 6,004,635 | * 12/1999 | Li | 428/23 |

* cited by examiner

*Primary Examiner*—Michael J. Carone
*Assistant Examiner*—Jeffrey L. Gellner
(74) *Attorney, Agent, or Firm*—Milde, Hoffberg & Macklin, LLP

(57) ABSTRACT

A vessel which have advantages of a flower-vase, a flower-arranging vase, a plant-pot, and an artificial-flower basket, and can extensively be utilized for the interior and exterior decorations. It is possible to keep the vessel in full bloom of flowers all the year round to provide blooming services for households and business concerned.

2 Claims, 9 Drawing Sheets

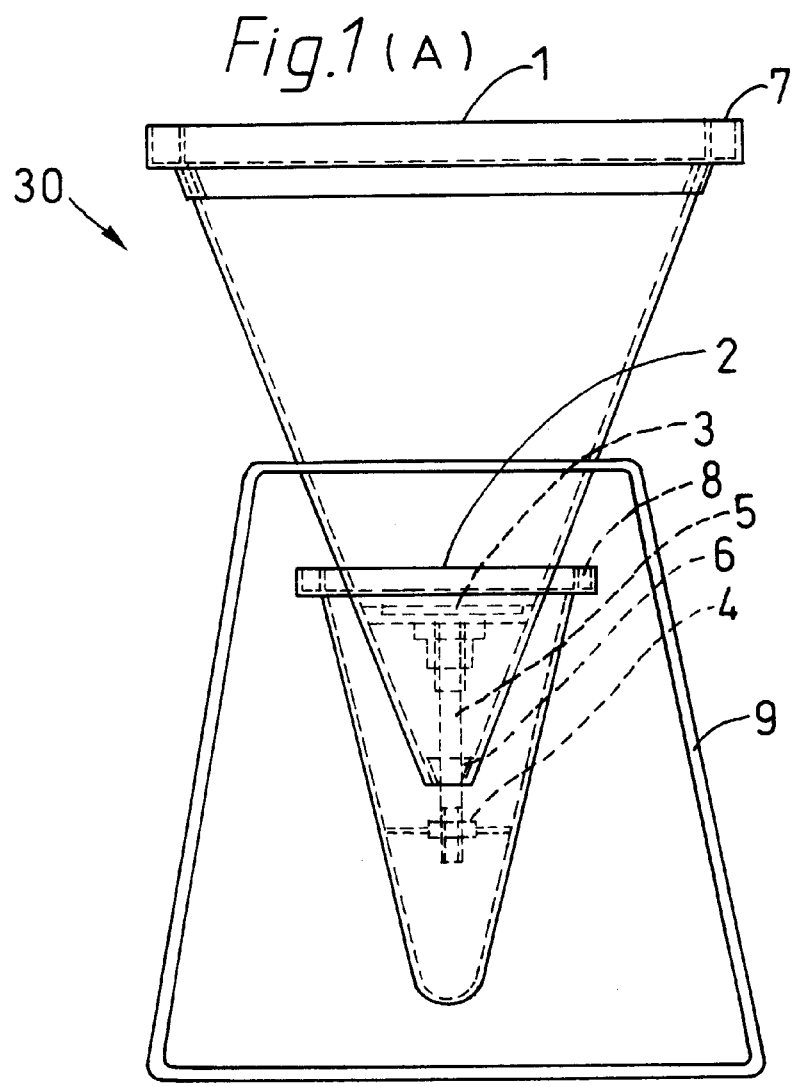
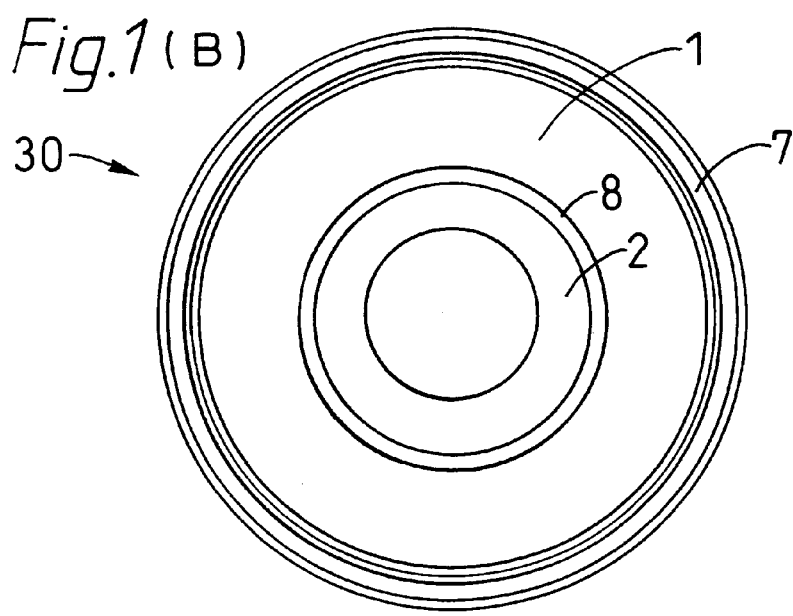

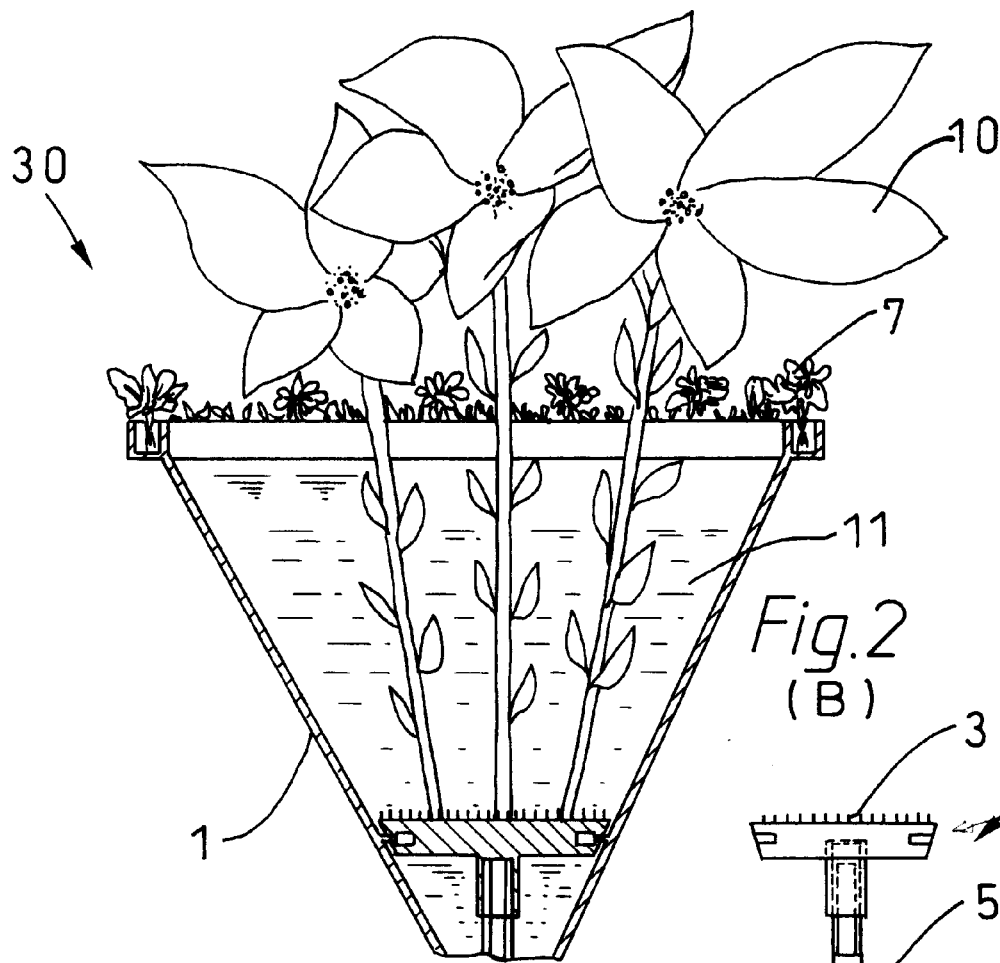
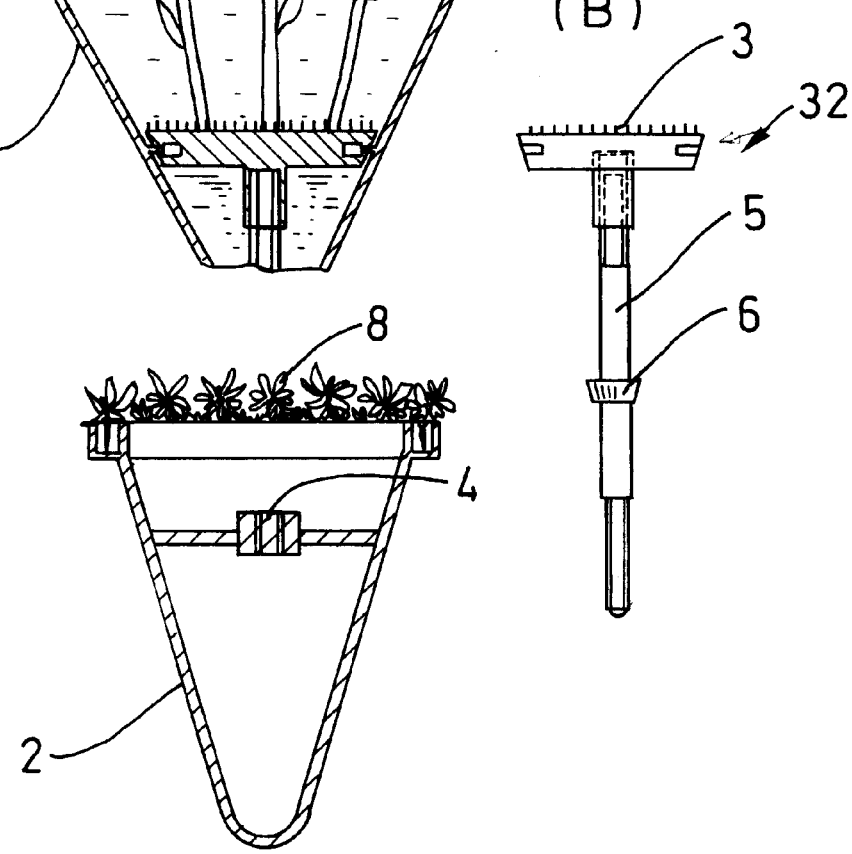

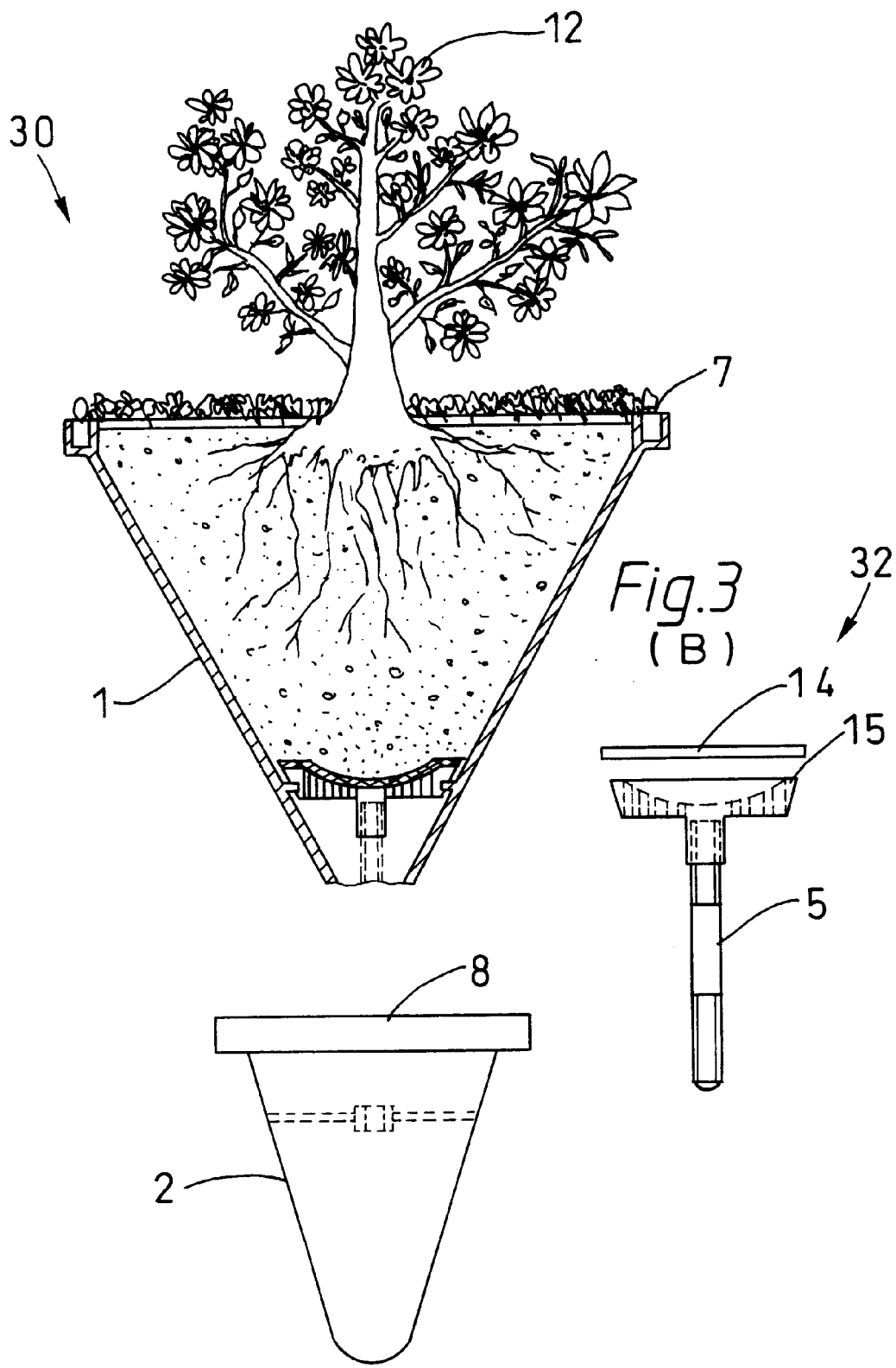

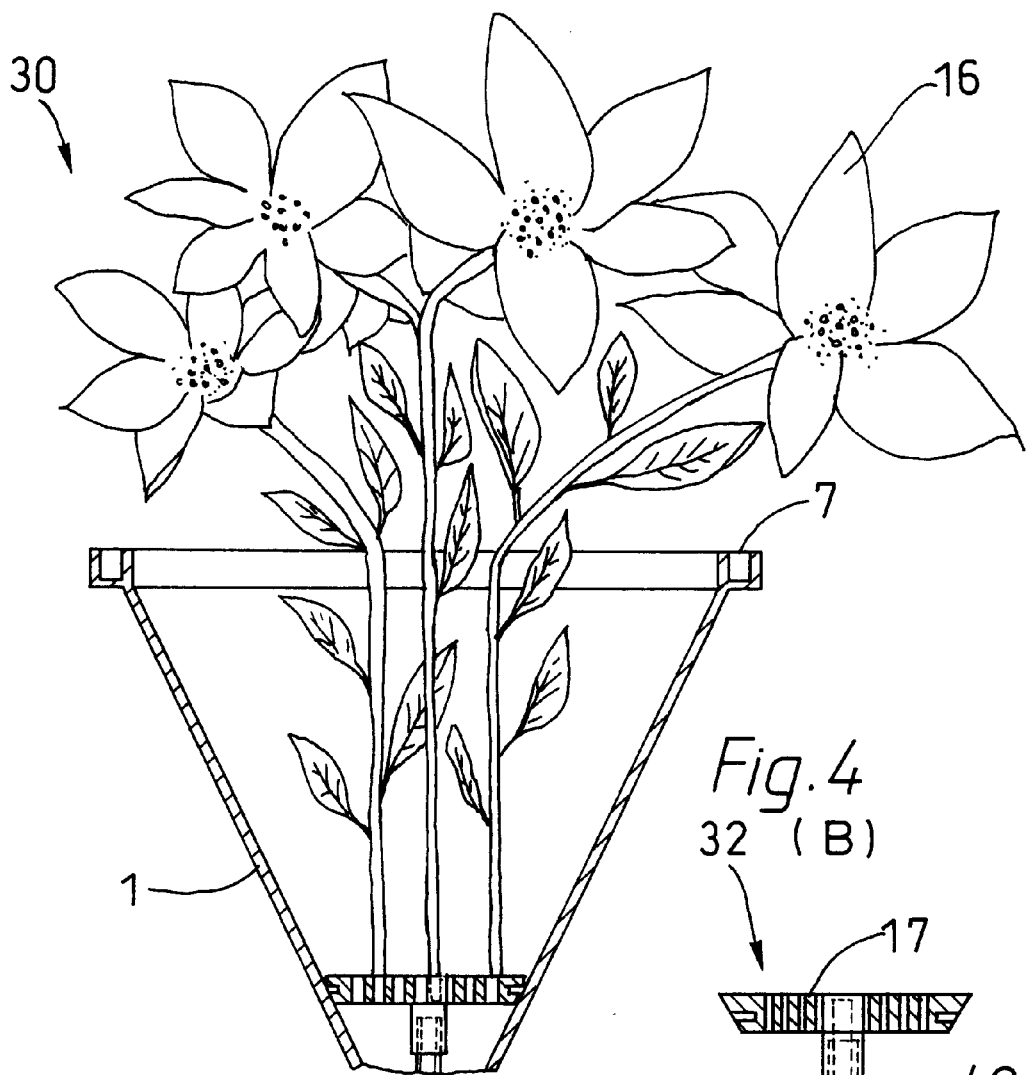
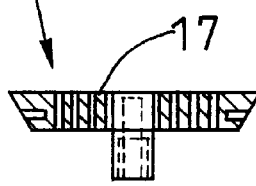
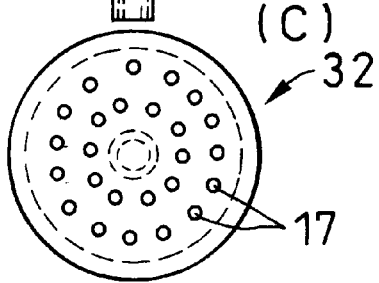
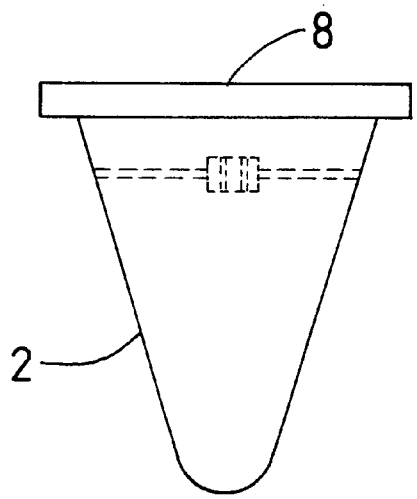

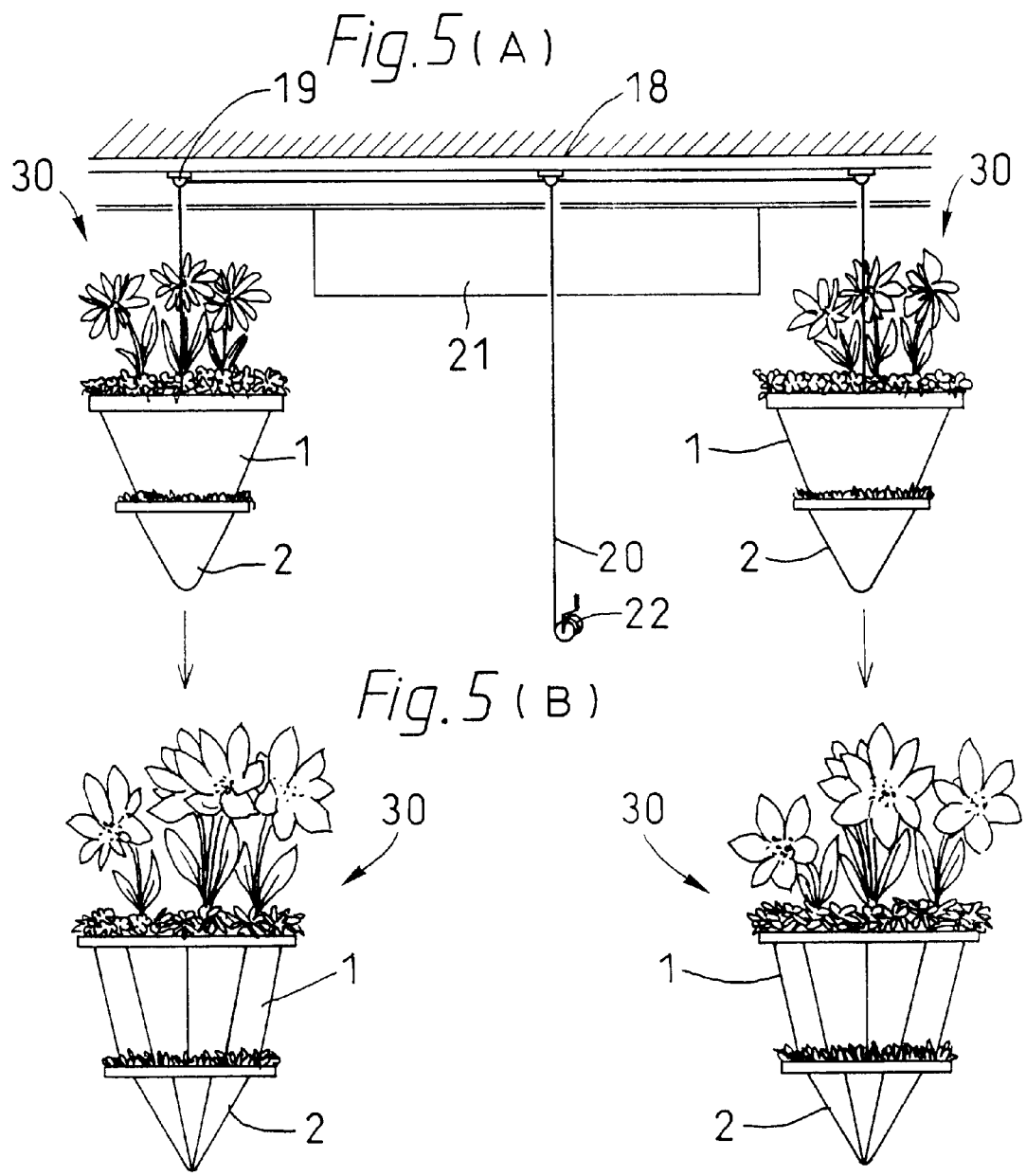

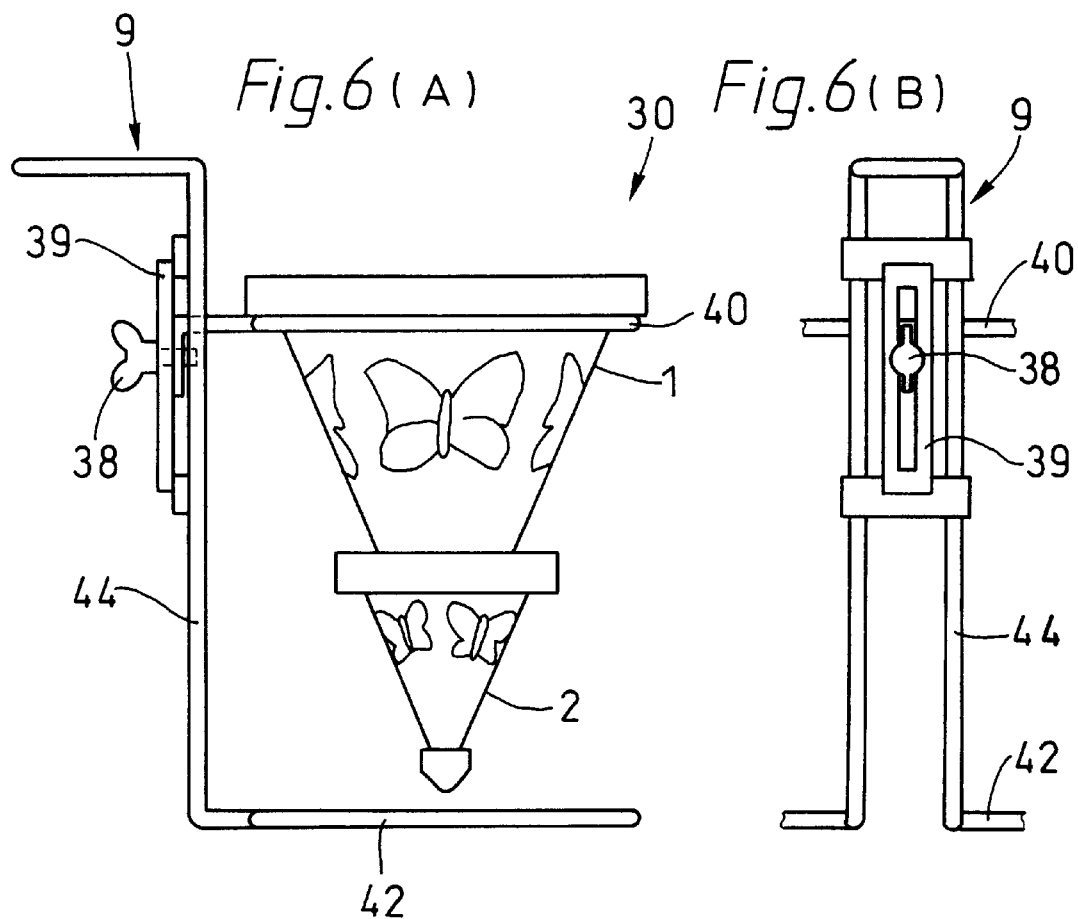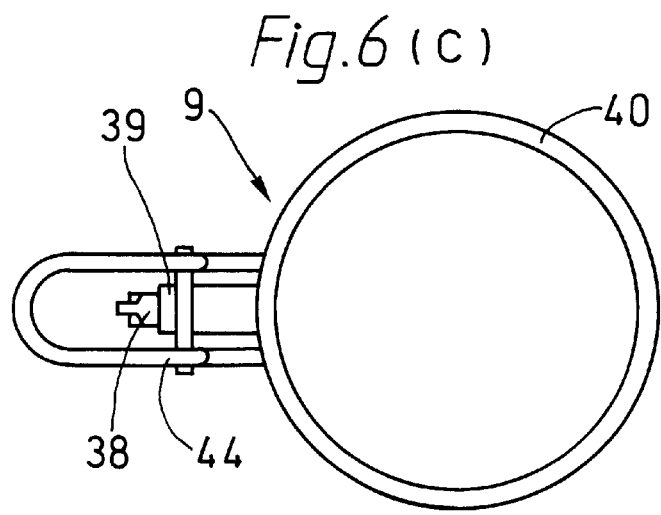

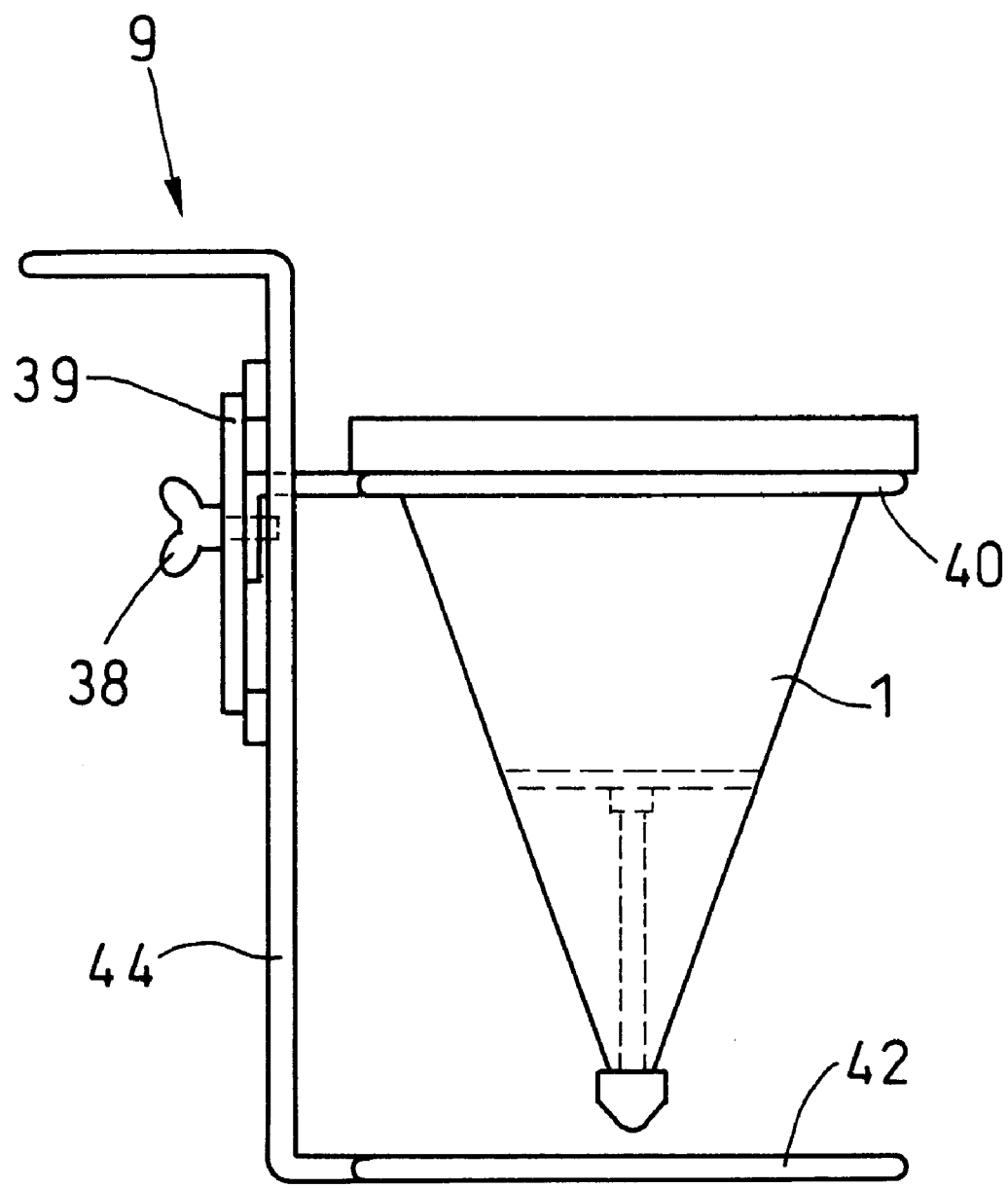

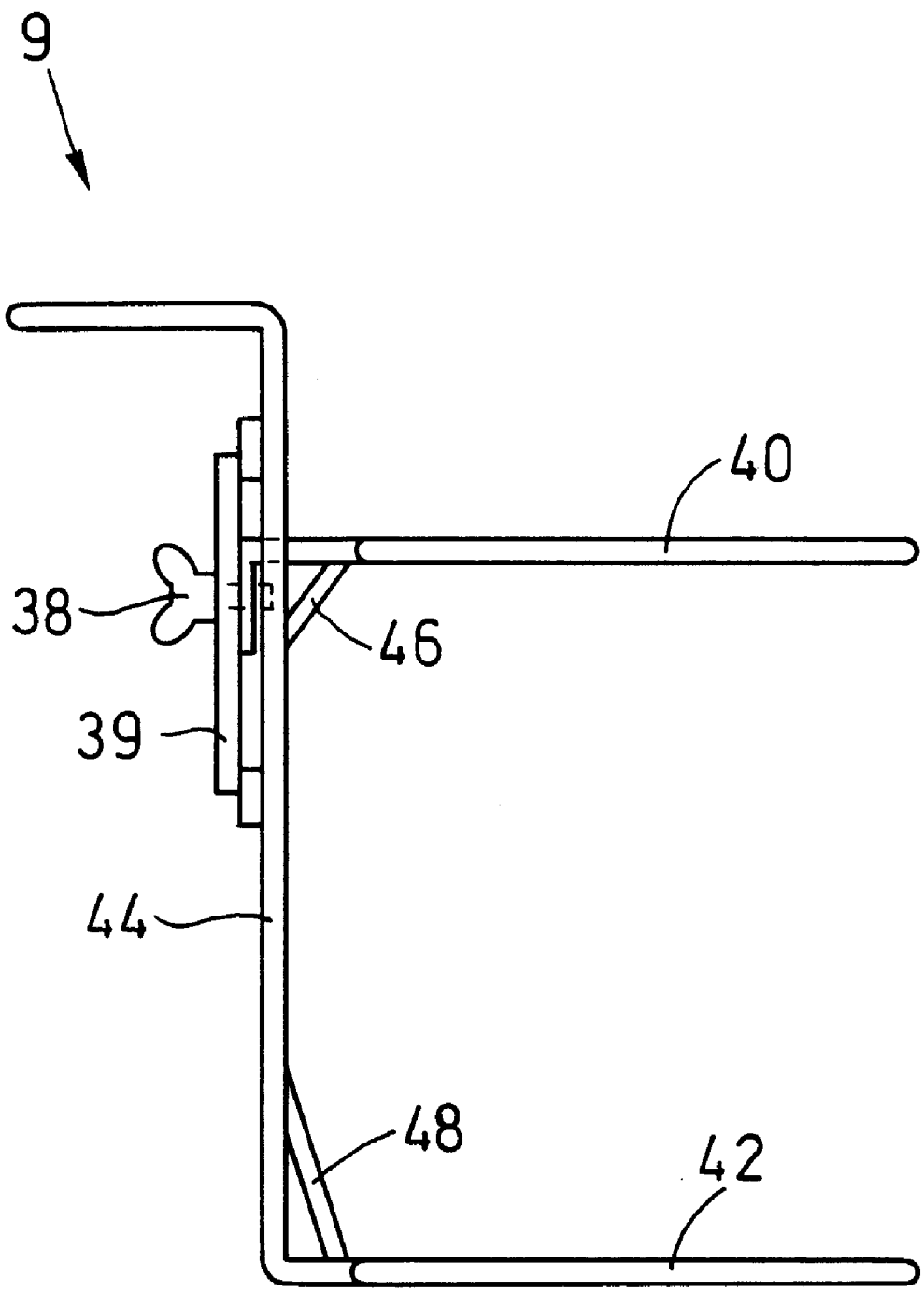

WINDING DEVICE, AND A VESSEL INCORPORATING ADVANTAGES OF A FLOWER-ARRANGING VASE, A FLOWER-POT, AND AN ARTIFICIAL-FLOWER BASKET

BACKGROUND OF THE INVENTION

The present invention relates to a vessel which can be used as an interior decoration and exterior decorative articles as well. More particularly, the invention relates to a vessel capable of along with flower arrangements, occupying an expansive area of a building by way of beautifully harmonizing the vessel with elaborate flower arrangements for brightening indoor and outdoor environments.

Conventionally, a flower-vase, a flower-pot, a flower-arranging vase, an artificial-flower vase, and other vessels are used for accommodating flowers as a single unit. Most of the flower-pots are unglazed in a certain form, and yet, each of them is monochromatically colored in a dark tone. Recently, some of the flower-pots are produced via deformation of pottery. Plastic vases and glass vases are used for flower-vases as a single unit.

BRIEF SUMMARY OF THE INVENTION

The inventive idea is originated in order to newly create an original work by way of conceiving how to beautifully express flowers and vessels or how to properly harmonize vessels with flowers. In other words, it was conceived to be quite important to see that flowers can always be blooming in vessels all the year round and yet flowers are freely and simply replaceable so that beautiful cubic space can be created by the spatial arrangement and effect of the flowers and vessels in combination to create a cubic space. "Cubic space" is meant to indicate the broad space of a building such as a front entrance, the sides or ceilings of a theater hall, or a hotel lobby or hallway (typically Japanese-style hotels and theaters). When the vessel for flower arrangement, according to the present invention, is placed in one of these types of broad spaced areas, the vessel and flower arrangements are then harmonized with the lights in the hall to produce an overall aesthetic visual effect.

The present invention has been achieved to fully satisfy the above requirements as a result of intensive study for harmonizing flower and vessels so that vessels can be utilized for interior and exterior decorations.

The vessel related to the present invention incorporates advantages of a flower-vase, a flower-arranging vase, a flower-pot, and an artificial flower basket. An object of the invention is to provide a vessel in which flowers, plants, or artificial flowers are replaced freely, and the use thereof can be changed freely. It is another object of the present invention to provide a vessel which can express the state of blooming flowers in vessels throughout the year by setting artificial flowers to the outside of the vessels. It is also possible to express cubic space by way of beautifully harmonizing flowers with the vessels. It is a still further object of the present invention to provide a vessel of which height can be adjusted while being suspended.

Accordingly, the vessel related to the present invention incorporates advantages of a flower-vase, a flower-arranging vase, a flower-pot, and an artificial-flower vase. The vessel related to the invention makes it possible to freely replace uses of flowers, plants, or artificial flowers. The inventive vessel comprises an upper container and a lower container in order to set artificial flowers to the outside or peripheral of the upper and lower containers. Artificial flowers are freely replaceable per season to enable the vessel to be always filled with blooming flowers throughout the year.

Form of the upper container or lower container of the vessel is optionally determined, which for example includes spherical form, conical form, cylindrical form, prism, and polyhedron or the like. Prism and polyhedron have the sectional view of triangle, quadrangle, hexagon, octagon, dodecagon, or the like.

The accompanying drawings exemplify an inversely-coned circular vessel and an inversely-coned octagonal vessel, whereby the vessel and flowers can express beautifully harmonized cubic space. When suspending the vessel, transparent and solid fishing lines are used. Suspending tools should also be as much transparent as possible.

The upper container of the inventive vessel can externally accommodate artificial flowers, whereas natural flowers can be accommodated inside of the upper component by setting a water-stopper to the lower container. When using the vessel as a flower-vase, soil and fertilizer are stored inside of the vessel for the plant to be provided. When feeding water to the plant, excessive water is pooled inside of the lower container. When using artificial flowers, artificial flowers are inserted into holes formed below the upper container.

When setting the inventive vessel inside and outside of houses, the vessel is suspended in space or secured onto a base.

The present vessel can be made from any materials known those skilled in the art, such as synthetic resin, glass, pottery, and metal. It is also possible to superficially decorate the vessel with pattern, picture, or coloring, or adhered with seal.

When using the inventive vessel in broad space or outside of a building, height of the vessel can properly be adjusted by applying a winding device. It is also possible to specially suspend advertisements or commercial messages between a plurality of flower vessels suspended on both sides. The vessels can also be utilized to promote a variety of events and other uses. When using the flower vessel in the fixed condition, the vessel is secured onto a solid base.

At night, artificial-flower-set portions of the upper or lower containers can be illuminated to beautifully show off flowers. Of a variety of illuminating means, it is also practicable to set bulbs to tip portions of photo-conductive fibers.

BRIEF DESCRIPTION OF THE DRAWINGS

FIGS. 1(A) and 1(B) are a front view and a cross-sectional view, respectively, of the vessel placed on a vessel-fixing base.

FIG. 2 is sectional views of the inventive vessel according to another embodiment of the invention, in which FIG. 2(A) represents a state of flowers 10 set inside of the vessel filled with water 11, where the lower figure illustrates the lower container 2, and FIG. 2(B) is a sectional view of a stopper 32, a fixture used when natural flowers are arranged, which has a needle-point holder 3 at the top portion, a shaft 5 capable of vertically moving an upper screw, and a packing 6 for sealing water, where a lower screw of the shaft 5 is secured to the lower container 2.

FIG. 3 is sectional views of the inventive vessel according to another embodiment of the invention, in which FIG. 3(A) represents a state of a plant 12 implanted in the vessel filled with soil and fertilizer 13, where the lower figure illustrates the lower container 2, and FIG. 3(B) is a sectional view of a stopper 32 fixable solely in the case of feeding water, which comprises a filter 14, a water-discharger 15, and a shaft 5.

FIG. 4 is a sectional view of the inventive vessel according to another embodiment of the invention, in which FIG. 4(A) represents a state of artificial flowers 16 inserted in the vessel, where the lower figure illustrates the lower container 2, and FIG. 4(B) illustrates a plurality of through-holes for inserting artificial flowers.

FIG. 5 is sectional views of the inventive vessel according to another embodiment of the invention, in which FIG. 5(A) represents a state of a pair of flower-implanted vessels respectively being suspended on both sides from ceiling 18 via a winding device 22, where a display panel 21 is set between the vessels;

FIG. 5(B) shows an octagonal flower vessel 30 of a downwardly-tapered, truncated cone shape, and also the containers 1 and 2 are planted with flowers while being suspended.

FIG. 6 is sectional views of the inventive vessel according to another embodiment of the invention, in which FIG. 6(A) is a side view of set of containers and a stand which can be used at home and in the office;

FIG. 6(B) is a back view and

FIG. 6(C) is a plain view of the stand for flower arrangement shown in FIG. 6(A);

FIG. 8 is a lateral view of the flower-vessel fixing base according to another embodiment of the invention.

FIG. 9 is a lateral view of the flower-vessel fixing base according to a still further embodiment of the invention.

DESCRIPTION OF THE PREFERRED EMBODIMENTS

Figure 7:
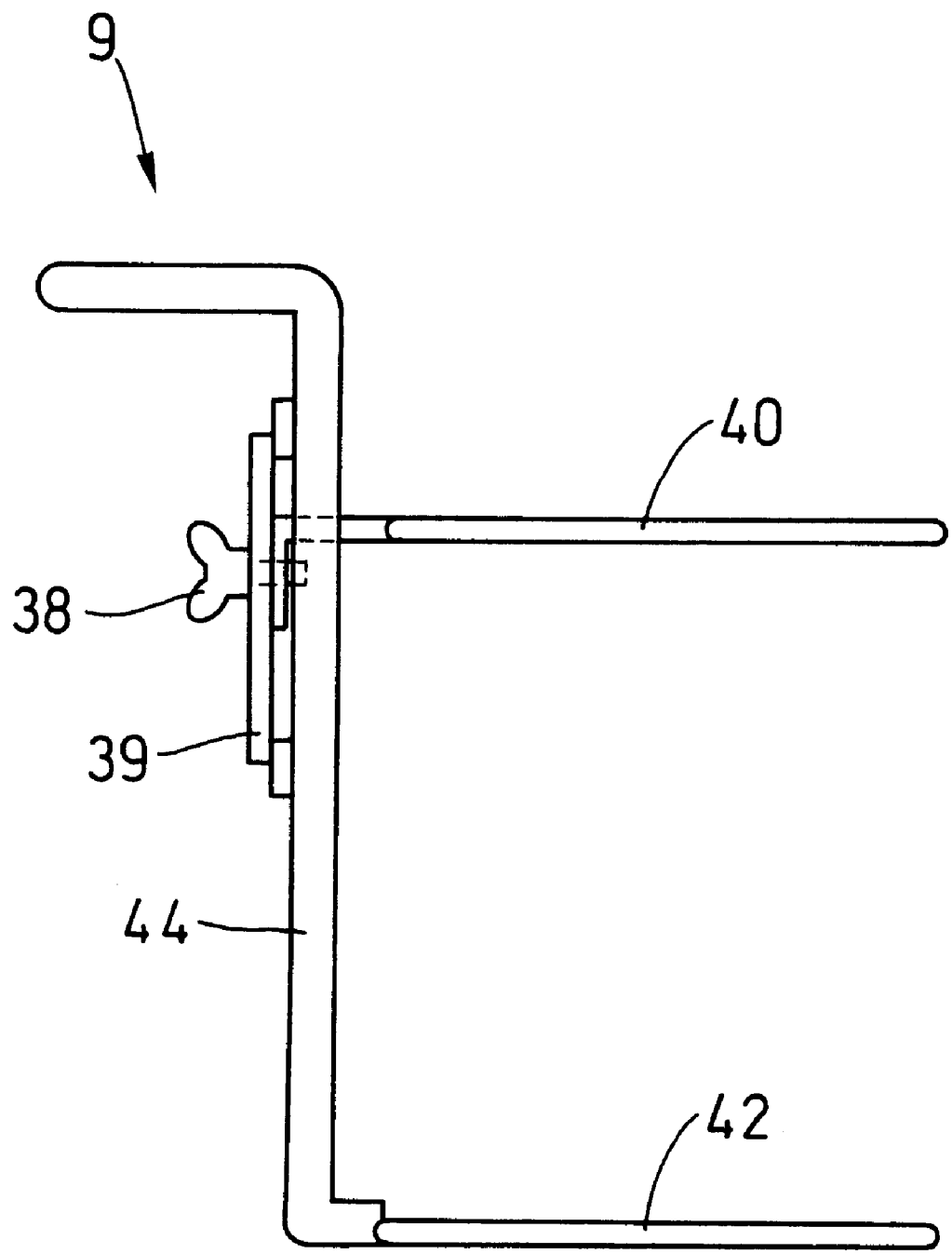
FIG. 7 is a lateral view of the flower-vessel fixing base according to another embodiment of the invention.

Referring now to the accompanying drawings, practical forms for embodying the flower-vessels related to the invention are described below. FIGS. 1(A) and 1(B) are the front and cross-sectional views, respectively, of the fully assembled flower vessel 30 according to an embodiment of the invention. FIG. 1(A) illustrates a completely-assembled flower vessel 30 which can be downwardly or upwardly suspended. A flower-vessel fixing base 9 can be used in a theater or a hotel, both optimally Japanese-style. The reference numeral 1 designates an upper container, 2 is a lower container, and 5 designates a shaft. Availing of the shaft 5, the upper vessel 1 is interconnected to the lower vessel 2 via a fixing nut 4. A multi-needle flower base 3 is secured to the upper container 1. In order to secure the shaft 5, screw of the lower portion of the multi-needle flower base 3 is threaded, where the lower portion of the multi-needle flower base 3 is screwedly engaged with the shaft 5. A rubber-made water-sealing packing 6 is set to the lower portion of the shaft 5 in order to seal water stored in the upper vessel 1 by vertically moving the shaft 5. Screw at the lower portion of the shaft 5 is threaded. The upper container 1 and the lower container 2 are respectively secured by a fixing nut 4 of the lower vessel 2. Artificial-flower-illuminator-fixing unit 7 is secured to the upper vessel 1. Artificial flowers and illuminators, or artificial flowers or illuminators are respectively set to the fixing unit 7. Artificial flowers are also set to the other artificial-flower illuminator-fixing unit 8. Flower-vessel fixing base 9 secures the inventive vessel 30 thereto.

The sectional view shown in FIG. 2(A) represents a state of flowers being implanted in the inventive vessel 30, where the upper container 1 is filled with water. The sectional view designates the state in which artificial flowers are set to the external peripheral portions of the upper container 1 and the lower container 2. Illuminators are also set to the external peripheral portions of the upper container 1 and the lower container 2 so that flowers 10 can be illuminated.

FIG. 2(B) is a sectional view of a stopper 32, a fixture to be used when natural flowers are arranged, which has a needlepoint holder 3 at the top portion, a shaft 5 capable of vertically moving an upper screw, and a packing 6 for sealing water, where a lower screw of the shaft 5 is secured to the lower container 2.

The sectional view shown in FIG. 3(A) represents a state of using the inventive vessel 30 as a plant-pot, where the interior of the upper vessel 1 is filled with fertilizer and soil. A water-filter 14 is set to the lower container 2. A water-discharger 15 is secured to the lower container 2. The water-discharger 15 is connected to the lower container 2 via the shaft 5. When feeding water to the plant 12, the lower container 2 functions as a water-pool.

FIG. 3(B) shows a stopper 32, a fixture to be used when natural flowers are arranged, which stops falling soil and fertilizer filled in the upper container 1 to the lower container 2 and comprises a filter 14 and a water-discharger 15 having holes for draining water.

The sectional view shown in FIG. 4(A) represents a state in which artificial flowers 16 are secured by way of inserting them into lower portions of the upper container 1. Flower-fixing unit (stopper) 32 can be used in conjunction with a plant fixing unit when utilizing the vessel 30 as a plant-pot.

FIG. 4(B) shows a stopper 32, a fixture to be used when artificial flowers are arranged, which has a plurality of holes for inserting artificial flowers. Since artificial flowers vary in thickness of their stems, the stopper 32 may have three sizes of holes.

FIG. 5(A) exemplifies utilization of broad space inside and outside of a building. The flower-vessel 30 is secured by a rotary fixing tool 19 secured to the ceiling 18. The rotary fixing tool 19 downwardly suspends or upwardly suspends the flower-vessel 30 via a winding device 22 secured to the building. FIG. 5(A) represents the circular flower vessels 30, which are respectively suspended downwardly. FIG. 5(B) shows an octagonal flower vessel 30 of a downwardly-tapered, truncated cone shape, and also the containers are planted with flowers while being suspended.

The invention also provides such a flower vessel 30 as the one shown in FIG. 6(A). In this flower vessel 30, the upper vessel 1 is secured to a flower-vessel-fixing base 9. The fixing base 9 comprises a ring 40 which secures the upper container 1 thereto and is capable of vertically moving itself against a slidable body 39 by way of loosening a screw 38, another ring 42 that can be stabilized on a desk or a table, and a frame 44 secured to the ring 42. The upper vessel 1 and the lower container 2 are superficially painted with figures of butterflies. By preparing such fancy vessels 30, beautiful decoration can be materialized by properly harmonizing flowers, plants, or artificial flowers with the vessels 30. Figures painted on the upper and lower containers 1 and 2 of the flower vessel 30 may also include birds aside from butterflies. Alternatively, blank surface may be provided for the upper and lower containers 1 and 2. Further, as shown in FIG. 7, the frame 44 for supporting the vessels 30 may be made of pipes. Likewise, as shown in FIG. 8, such a vessel solely consisting of the upper container 1 may be set to the fixing base 9. Further, as shown in FIG. 9, reinforcing members 46 and 48 may also be provided for the fixing base 9.

The shaft 5 of the vessel 30 is connected to the upper container 1 by the stopper 32. The bottom of the shaft 5 is fixed by the nut 4. Thus, the shaft 5 functions as a connector for combining the upper container 1 and the lower container 2. The shaft 5 can be fixed by screwing or ruggedly fitting the shaft 5 to the upper container 1. Alternatively, the stopper 32 can be inserted into the upper container 1 without being fixed, thereby the lower container 2 may be suspended from the upper container 1. The distance between the upper container 1 and the lower container 2 can be changed optionally by screwing the shaft 5 along the groves of the nut 4, which is fixed to the lower container 2, or by screwing the nut 4 along the groves of the shaft 5.

The vessel 30 of the present invention can be used as a flower-arranging vase, a plant pot, and an artificial-flower basket by replacing the various kinds of stoppers 32 fixed at the top part of the shaft 5, e.g., those with a multi-needle flower base 3, a water dischager 15, or holes for artificial flowers 17. The use of the vessel 30 of the present invention can also vary without changing the type of the stopper 32.

Practical forms for embodying the invention have thus been fully described by referring to the accompanying drawings. It should be understood however that the scope of the vessel incorporating advantages of flower-arranging vase, flower-pot, and artificial basket related to the invention is not solely limited to those shown in the accompanying drawings, but the invention can also be implemented via any form other than those which have been exemplified above.

For example, sectional form of the vessel is not solely limited to circular form or octagonal form cited above, but any other form may also be introduced. Objective use of the inventive vessel incorporating advantages of flower-arranging vase, flower-pot, and artificial flower basket is not solely limited to flowers, plant, and artificial flower basket, but the inventive vessel may also be applied to other uses. It should also be understood that the scope of the invention is not specifically restricted insofar as the vessel related to the invention comprises the upper and lower vessels which are respectively capable of disposing flowers, plants, or artificial flowers in and around the periphery of the upper and lower vessels themselves.

Technical scope of the invention also includes such forms added with a variety of improvements, modifications, and changes, based on knowledge of those skilled in the art within a scope that does not deviate from the essentials of the invention.

What is claimed is:

1. A container for using as a flower-arranging vase, a plant pot or an artificial flower basket, comprising:

(a) an upper container;

(b) a lower container;

(c) a stopper secured in said upper container, which stops the falling of at least one of natural flowers, artificial flowers, potted plants, fertilizer and soil to said lower container;

(d) a nut secured in said lower container; and (e) a shaft, its upper end being connected to said stopper and its lower end being connected to said nut;

wherein said upper container is connected to said lower container through said shaft.

2. A container according to claim 1, wherein said upper and said lower containers comprise an artificial-flower-fixing unit for setting artificial flowers.

* * * * *